(12) United States Patent
Chavarria et al.

(10) Patent No.: US 11,365,006 B2
(45) Date of Patent: Jun. 21, 2022

(54) EXTENDED DISPLAY INTEGRATION FOR PASSENGER SEATS

(71) Applicant: Safran Seats USA LLC, Gainesville, TX (US)

(72) Inventors: Daniel Chavarria, Chihuahua (MX); Jose Madrigal, Chihuahua (MX); Teresa del Carmen Antillon, Chihuahua (MX); Cristina Bermudez, Chihuahua (MX); Nguyen Foek Le, Arlington, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/288,805

(22) PCT Filed: Oct. 31, 2018

(86) PCT No.: PCT/US2018/058409
§ 371 (c)(1),
(2) Date: Apr. 26, 2021

(87) PCT Pub. No.: WO2020/091756
PCT Pub. Date: May 7, 2020

(65) Prior Publication Data
US 2022/0009635 A1    Jan. 13, 2022

(51) Int. Cl.
*B64D 11/00* (2006.01)
*B64D 11/06* (2006.01)

(52) U.S. Cl.
CPC ...... *B64D 11/0015* (2013.01); *B64D 11/0606* (2014.12)

(58) Field of Classification Search
CPC . B64D 11/0015; B64D 11/0606; B60R 11/02; B60R 11/0229; B60R 11/0235;
(Continued)

(56) References Cited

U.S. PATENT DOCUMENTS

2006/0075934 A1    4/2006  Ram
2010/0252680 A1    10/2010 Porter
(Continued)

FOREIGN PATENT DOCUMENTS

EP        1992520 A2    11/2008
EP        2268024 A1    12/2010
(Continued)

OTHER PUBLICATIONS

International Patent Application No. PCT/US2018/058409, International Search Report and Written Opinion, dated Aug. 14, 2019.
(Continued)

*Primary Examiner* — Philip J Bonzell
(74) *Attorney, Agent, or Firm* — Kilpatrick Townsend & Stockton LLP

(57) ABSTRACT

Described are extended display devices for a passenger compartment including a first display device and a second display device, the first display device positioned in an outer frame to face a passenger seat and the a second display connected with and positioned laterally relative to the first display, wherein the first and second displays are configured to simultaneously display information from two different sources. One or both display devices can be attached modularly within a void through the outer frame and within an insert that matches the inner boundary of the outer frame and matches the exterior boundary of the display device.

12 Claims, 4 Drawing Sheets

(58) Field of Classification Search
CPC .... B60R 2011/0276; B60R 2011/0282; B60N 3/00
See application file for complete search history.

(56) References Cited

U.S. PATENT DOCUMENTS

| | | |
|---|---|---|
| 2011/0316311 A1 | 12/2011 | Westerink et al. |
| 2012/0066726 A1 | 3/2012 | Mondragon et al. |
| 2014/0283296 A1* | 9/2014 | Jerome .............. B64D 11/0604 5/12.1 |
| 2014/0284972 A1 | 9/2014 | Riedel et al. |
| 2014/0284973 A1 | 9/2014 | Wolgast et al. |
| 2015/0001341 A1* | 1/2015 | Ersan ................ B64D 11/0601 244/118.6 |
| 2016/0159481 A1 | 6/2016 | Gianakopoulos et al. |
| 2016/0249073 A1 | 8/2016 | Margis et al. |
| 2018/0194471 A1 | 7/2018 | Merrick et al. |

FOREIGN PATENT DOCUMENTS

| | | |
|---|---|---|
| GB | 2468107 A | 8/2010 |
| GB | 2500258 A | 9/2013 |
| WO | 2018035544 A2 | 2/2018 |

OTHER PUBLICATIONS

Thales Group, "Immersive Seat for Business Class", Jun. 10, 2015, https://www.businessclass.com/archive/article/gb/check-out-thales-new-immersive-seat-we-test-the-aviation-worlds-most-advanced-aircraft-seat.

Wipro Limited, "In-Flight Entertainment and Connectivity Innovations", Jan. 24, 2013, https://bit.ly/2xEJo7R.

\* cited by examiner

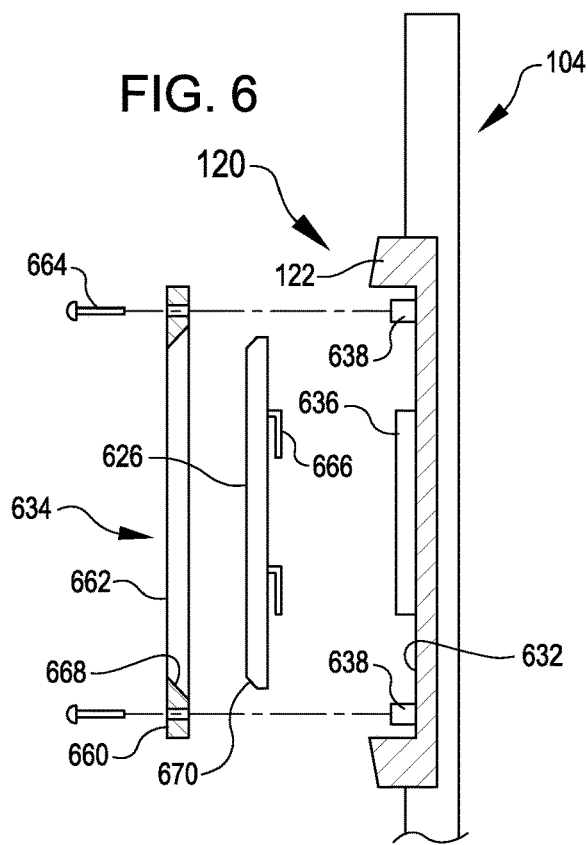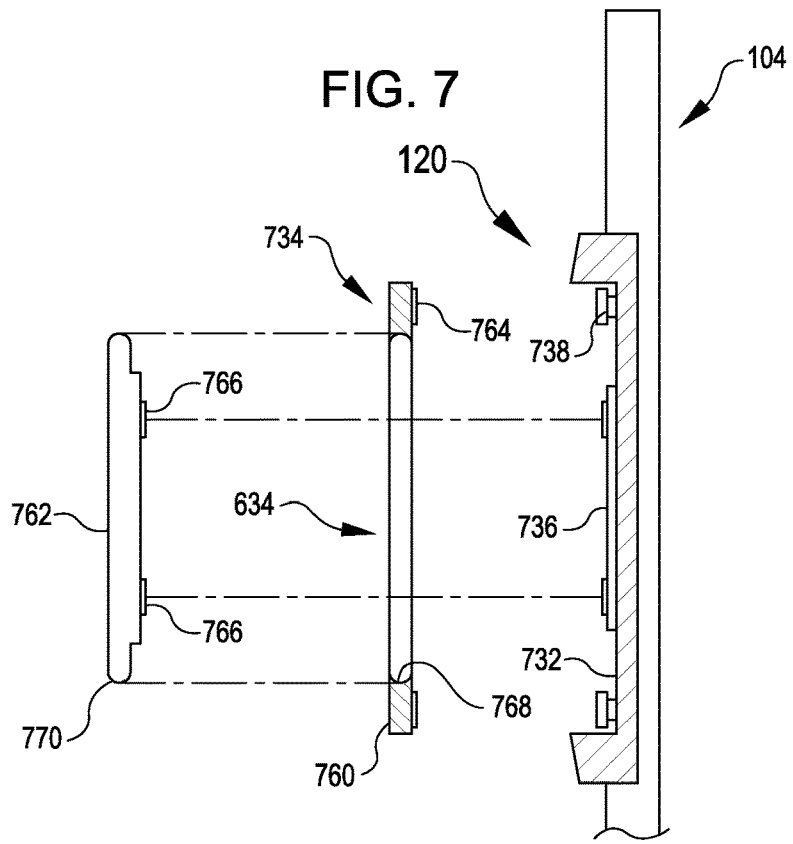

EXTENDED DISPLAY INTEGRATION FOR PASSENGER SEATS

The field of the invention relates to monitor and particularly multi-monitor assemblies for use in passenger cabins.

BACKGROUND

In commercial aircraft, fixtures that provide passenger privacy, comfort, and entertainment compete for space in the limited dimensions available for such installations, and within the limited weight allowances. Such assemblies must be lightweight, comfortable, and connected with the structures of the aircraft sufficiently to withstand significant physical shock. Due to these and other structural and safety concerns, traditional entertainment and media assemblies tend to be relatively bulky, and often take a "one size fits all" approach, making them inappropriate for some of the various seating configurations into which they are placed. In addition, although the quality of portable display devices continually improves, airlines must also continue to provide access to safety information, flight information, and entertainment options in an environment where connection to ground-based communications is not always possible. Due to these and other structural and safety concerns, improved solutions for passenger media devices are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a cabin seat arrangement can include an array of multiple seats separated or partially enclosed by a series of privacy screens or enclosures. Each enclosure can include a mounted display assembly containing a primary display device for displaying most onboard media such as movies, games, shows, announcements, or the like, and a secondary display for displaying alternative information simultaneously. A variety of configurations of the primary and secondary screens are possible.

In some embodiments, the primary and secondary displays can be aligned with each other along the enclosure, and operably connected with a controller or onboard computing device to display different media simultaneously. In some embodiments, the secondary display can be offset from, and angled at an oblique angle from the primary display, so that both display devices are preferentially angled toward a user positioned in a seat facing the enclosure to which the display assembly is attached. Alternatively, in some embodiments the secondary display can be positioned along an outer or aisle-facing surface of the screen or enclosure at more than a 180-degree angle from the primary display, and used to display information to persons in the aisle such as identifying information about the seat, passenger requests, safety information, or the like. In some embodiments, two secondary screens may be used, both facing toward the passenger seat and facing toward the aisle. In some embodiments, the primary and secondary displays can be portions of a continuous or monolithic display device that are configured to receive and display information from two different sources simultaneously.

In some embodiments, the primary display can include a modular assembly of an outer frame, a display device, and an insert providing matching dimensions between the two. The outer frame can include an outer face with a void therethrough and a first set of attachment elements for connecting the outer frame with a passenger-facing internal aircraft structure. The insert can be sized to match the boundary of the void through the outer frame and provide an internal void to receive the display device. The display device can be connected with the passenger-facing internal aircraft structure when assembled and received within the insert so that the display device, insert, and outer frame align with each other to secure cabling, hide attachment elements, and form a smooth and attractive surface with minimal hard angles that could otherwise impede passenger safety. Modular inserts in a variety of sizes and form factors can be provided to adapt display devices in varying sizes with the modular assembly, enabling standardization of the outer frame and/or secondary displays while simplifying periodic replacement of the display device. In some embodiments, the modular inserts can include features that align or link the insert with the display device, such as a matching bezel or a snap fit connection.

BRIEF DESCRIPTION OF THE DRAWINGS

FIG. 6 is a side section view showing a cross-section of a first example of a modular extended display assembly for a privacy enclosure or screen.

FIG. 7 is a side section view showing a cross-section of a second example of a modular extended display assembly for a privacy enclosure or screen.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide extended display assemblies for passenger seats, privacy enclosures and screens. While the extended display assemblies are discussed for use within an aircraft cabin, they are by no means so limited. Rather, embodiments of the extended display assemblies may be used in conjunction with passenger seats for other applications or other seats of any type or otherwise as desired.

Figure 1:
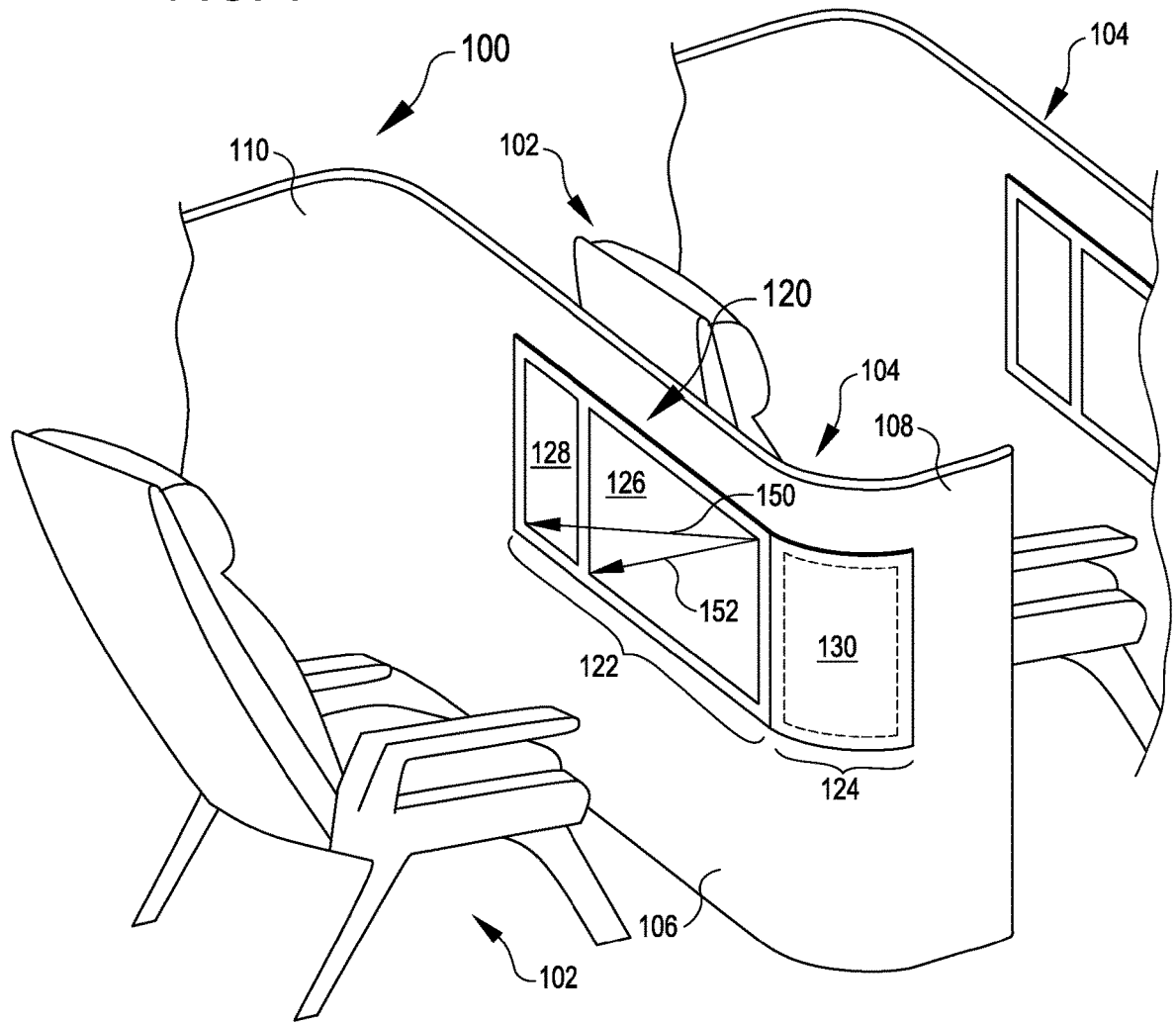
FIG. 1 is a perspective view showing a first example of a passenger seat arrangement in conjunction with a privacy enclosure or screen that includes an integrated extended display assembly, according to certain embodiments of the present disclosure.

According to certain embodiments of the present invention, as shown in FIG. 1, a passenger seat arrangement 100 can include one or multiple seat assemblies 102 arrayed in conjunction with and separated from each other by privacy enclosures 104, which can include shells, screens, or a variety of other passenger-facing internal aircraft structures. The seat assemblies 102 and privacy enclosures 104 are typically connected with the surrounding cabin, or are otherwise fixed to the aircraft structure, but may in some cases be connected with each other. Generally, both the seats 102 and enclosures or screens 104 are rigidly attached to an aircraft floor separately from each other and each capable of withstanding substantial acceleration, deceleration, and shock. Components mounted to either structure are similarly attached to withstand significant force, so as to withstand impact or turbulence and protect passengers in an impact event.

A seat-facing portion 106 of each enclosure 104 includes an extended display assembly 120 attached thereto, and additional structures or cabin elements may be attached to an outer, aisle-facing wrapping portion 108 of the enclosure, or to an inner, passenger-facing portion 110 of the enclosure. In some cases, portions of the display assembly 120 may also be connected with the aisle-facing or inner portions 108, 110 of the enclosure. The extended display assembly 120 includes a main display 126 and a secondary display 128, the main and secondary displays cumulatively having an angular size 150 of at least 38 to 61 cm (about 15" to 24"), preferably at least 43 cm (17"), preferably at least 53 cm (21"), and more preferably at least 61 cm (24"). In some embodiments, the main display 126 alone may have an angular screen size of at least 43 cm (17"), preferably at least 53 cm (21"), more preferably at least 61 cm (24"). Any suitable display aspect ratio can be used, including common 4:3 aspect ratios, widescreen 16:10 or 16:9 aspect ratios, ultra wide 21:9 aspect ratios, or other ratios.

The secondary display 128 is attached with the display assembly 120 offset laterally from and optionally directly adjacent to the main display 126, but may be separated from the main display, and may additionally have a different orientation with respect to the main display, or a different distance from the passenger seat assembly 102. According to some embodiments, both the main display 126 and secondary display 128 are connected with an outer frame 122 of the display assembly 120, so that both displays are positioned in a direct line of sight of a passenger when the facing passenger seat 102 is in use. In some alternative embodiments, the aisle-facing portion 108 of the enclosure 104 can include an alternate secondary display 130, or in some cases a third display, that displays information toward an aisle adjacent the enclosure. Detailed descriptions of the above elements are described below with reference to FIGS. 2-7.

Figure 2:
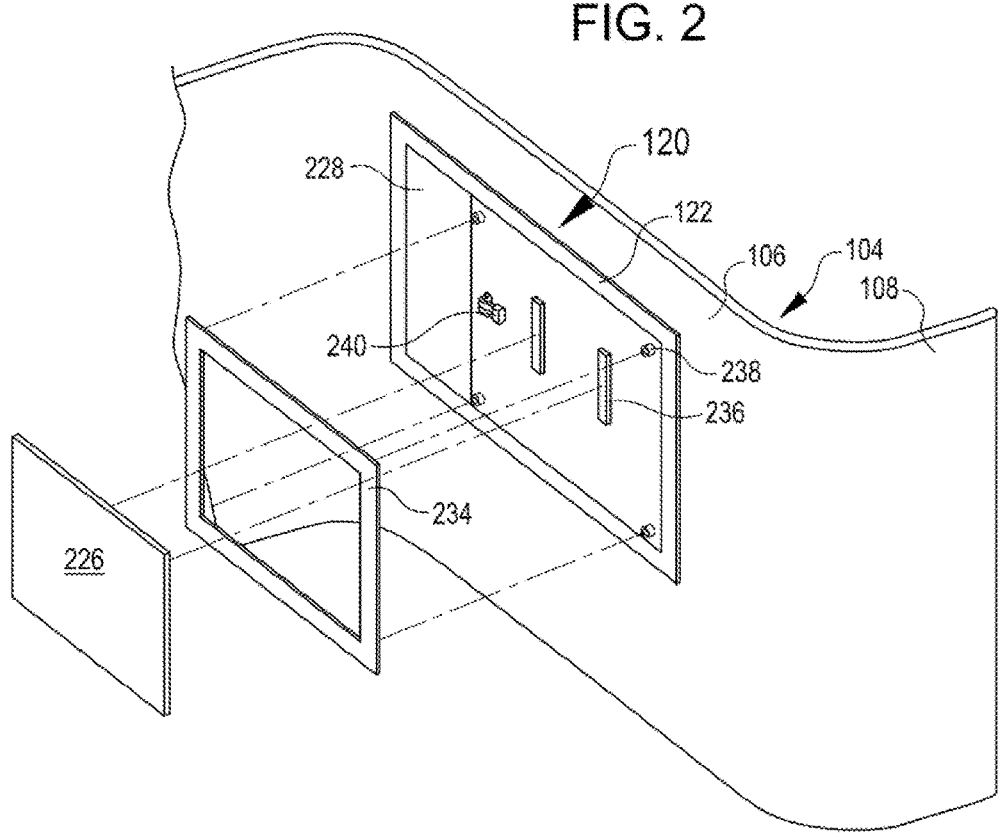
FIG. 2 is a perspective view showing a first example of a modular extended display assembly for a privacy enclosure or screen, according to at least some embodiments.

FIG. 2 is a perspective view showing a modular extended display assembly 120 for a privacy enclosure 104, according to at least some embodiments of the present disclosure. The extended display assembly 120 includes an outer frame 122 that is securely connected with the privacy enclosure 104, on a passenger-facing surface 106 thereof. The display assembly 120 includes a main display 226 and a secondary display 228 offset laterally from the main display. According to some embodiments, the main display 120 is positioned centrally with respect to the facing surface 106 of the privacy enclosure 104 so that, when an associated passenger seat is in use, the main display falls within the preferred, central viewing angle from the passenger seat. The secondary display 228 is positioned within view, offset from the central viewing angle, so that the secondary display 228 can be used to display essential information or announcements without interrupting content on the main display 226.

According to least one embodiment, the modular extended display assembly 120 includes an open frame 232 in which the main display 226 and secondary display 228 are attached. The main display 226 can be connected within the open frame 232 by way of a main support bracket 238 or other suitable attachment element. In some embodiments, bracket 238 is directly attached to the privacy enclosure 104 to impart stability and a rigid connection to the main display 226. In some alternative embodiments, the display bracket 238 may also be attached with the enclosure 104 by way of an intervening structure of the frame 232. The open frame 232 can be sized to receive the main display 226 directly without leaving any intervening peripheral space between the main display and open frame; but preferably, the open frame 232 is sized to accommodate a variety of main display sizes and aspect ratios therein that can be matched to the open frame by matching insert 234.

The matching insert 234 has an outer periphery sized to match the open frame 232 and an inner void sized to match the main display 226. In this way, a variety of main display aspect ratios, screen sizes, and particular models of main display can be accommodated by one or several common sizes of the open frame 232. For example, particular dimensions of the open frame 232 can be assembled with the privacy enclosures for specific airplane cabin layouts, depending on the available space, and then matched with combinations of main displays 126 and matching inserts 234 depending on the dimensions of the selected open frame 232 and the dimensions of the selected main display 126, based on aspect ratio, screen size, and peripheral space around the screen. The matching insert 234 can be connected with the enclosure 104 by way of, e.g., a set of secondary support brackets or spacers 238 positioned within the open frame 232, and connected either directly to the enclosure 104 or indirectly by way of the frame 232.

Removable power and/or display connectors 240 can be routed through the open frame 232 for connecting the main display 226 with a central computing system or display controller. Alternatively, in some embodiments the displays can include wireless communication devices for receiving information without wired connections. This modular approach provides a safe, cost-effective, and upgradable system for integrating display devices in the passenger compartment. Modular display assemblies including the matching insert 234 can be applied to match a main display with the display assembly 120, but optionally to connect a secondary display (e.g. secondary display 128, as shown in FIG. 1), or to connect one or more displays to various alternative configurations of an extended display assembly, as described below with reference to FIGS. 2-5.

Figure 3:
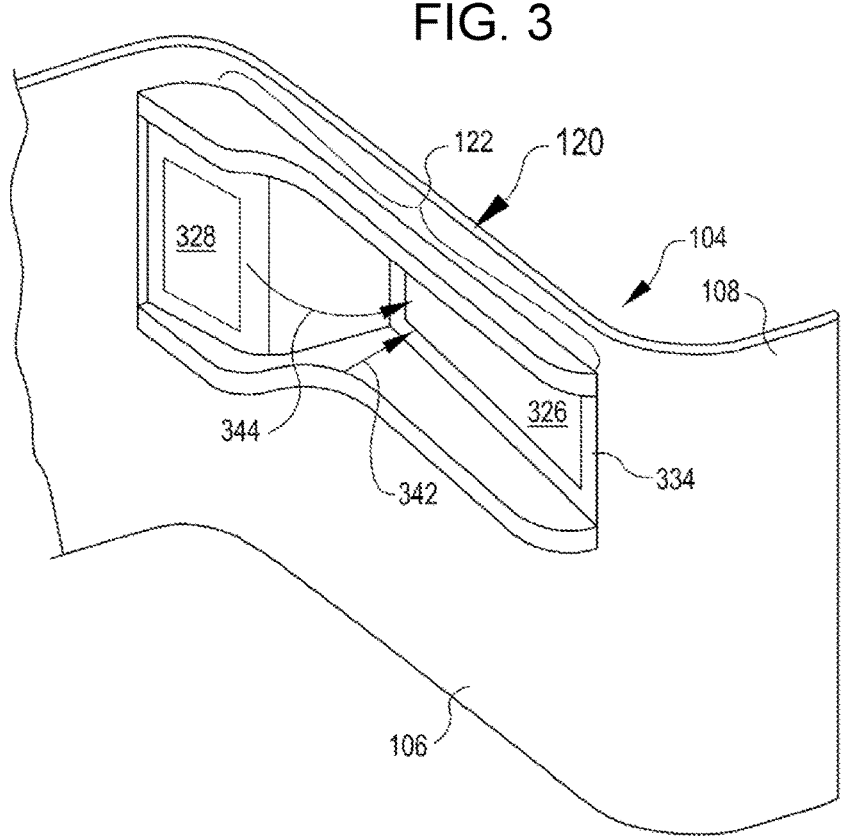
FIG. 3 is a perspective view showing an extended display assembly for a privacy enclosure or screen having a depth and angle offset between the main display and a secondary display, according to at least some embodiments.

FIG. 3 is a perspective view showing an alternative configuration of the extended display assembly 120 for privacy enclosure 104, the alternative configuration having a depth and angle offset between the displays, according to at least some embodiments of the present disclosure. The extended display assembly 120 includes an outer frame 122 that is securely connected with the privacy enclosure 104 along the passenger-facing surface 106 of the enclosure. The main display 326 is inserted in the outer frame 122 to provide a preferred viewing angle (e.g., perpendicular) to a facing passenger seat when the enclosure 104 is assembled in a passenger cabin (FIG. 1). According to some embodiments, providing this angle may require that the outer frame 122 extend by a nonzero depth 342 either into the body of the enclosure 104, outward from the enclosure, or both. According to some embodiments, the angle of the main screen may be about 0 to 10 degrees with respect to the passenger-facing portion 106 of the enclosure. According to various embodiments, the angle of the main display 326 may be adjusted based on the orientation of the passenger-facing portion 106 of the enclosure so that the main display 326 is oriented toward a passenger seat to minimize glare and viewing angle. This angle may be 0 to 5 degrees, 0 to 10 degrees, or in some cases up to 90 degrees or exceeding 90 degrees. A secondary display 328 can be provided at a lateral offset from the main display 326, and may additionally be angled with respect to the main display by a nonzero angle 344, such that the main display and secondary display are both passenger-facing when installed in a passenger cabin. According to various embodiments, the angle of the secondary display 328 may also be adjusted based on the orientation of the passenger-facing portion 106 of the enclosure, and also depending on an offset between the secondary display 328 and the main display 326, so that the secondary display is oriented toward a passenger seat to minimize glare and viewing angle. This angle may be 0 to 5 degrees, 0 to 10 degrees, up to 90 degrees, or exceeding 90 degrees.

Figure 4:
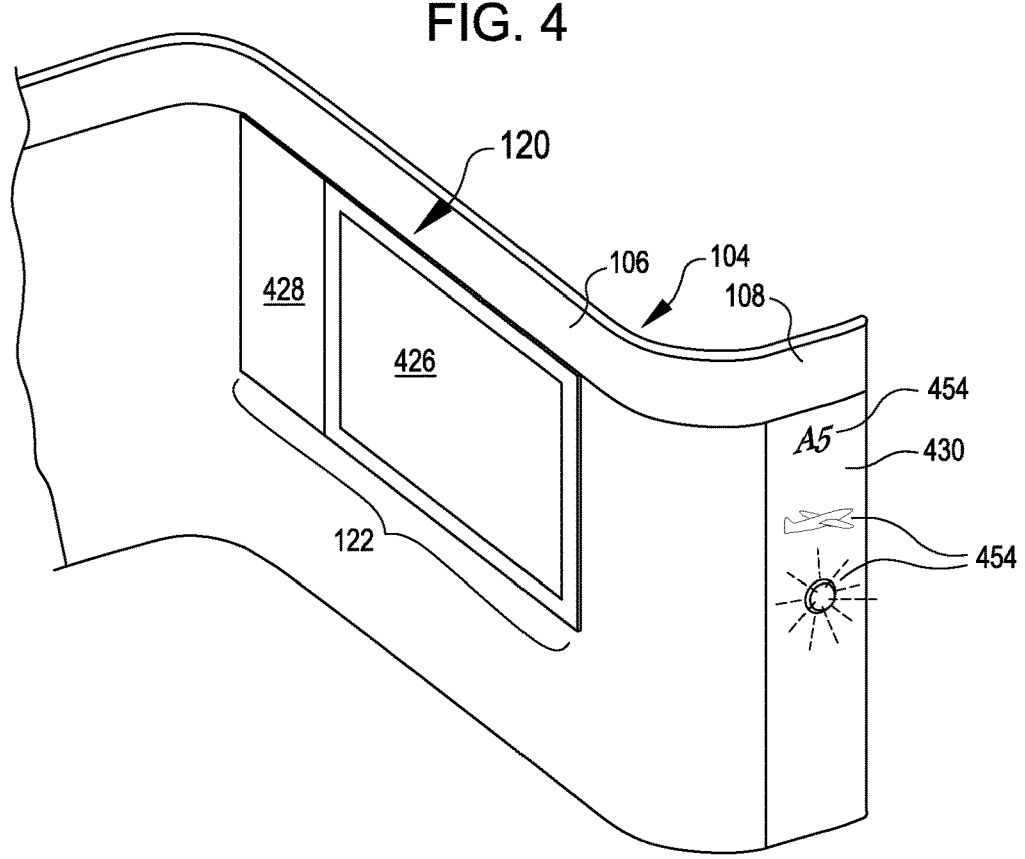
FIG. 4 is a perspective view showing an extended display assembly for a privacy enclosure or screen having an aisle-facing secondary display, according to at least some embodiments.

FIG. 4 is a perspective view showing another example configuration of the extended display assembly 120 for a privacy enclosure 104 having an aisle-facing secondary display 430, according to at least some embodiments. The extended display assembly 120 includes an outer frame 122 that is securely connected with the privacy enclosure 104 along at least a passenger-facing surface 106 of the privacy enclosure 104, and preferably extending along an aisle-facing portion 108 of the privacy enclosure 104. In some embodiments, a separated portion of the display assembly 120 may be positioned on the aisle-facing portion 108 of the enclosure 104 and separate from the outer frame 122 surrounding the main display 426.

The main display 426 with or without a secondary display 428 can be assembled with the outer frame 122 according to any suitable configuration as discussed herein, and an alternate second display 430 can be attached with the aisle-facing portion 108 of the enclosure 104, and positioned such that informational indicia 454 displayed by the aisle-facing alternate second display 430 can be viewed by staff or passengers from outside the privacy enclosure 104. Suitable informational indicia 454 can include, e.g., seat numbering, service requests or "do not disturb" indicators, information for passenger assistance, or the like.

Figure 5:
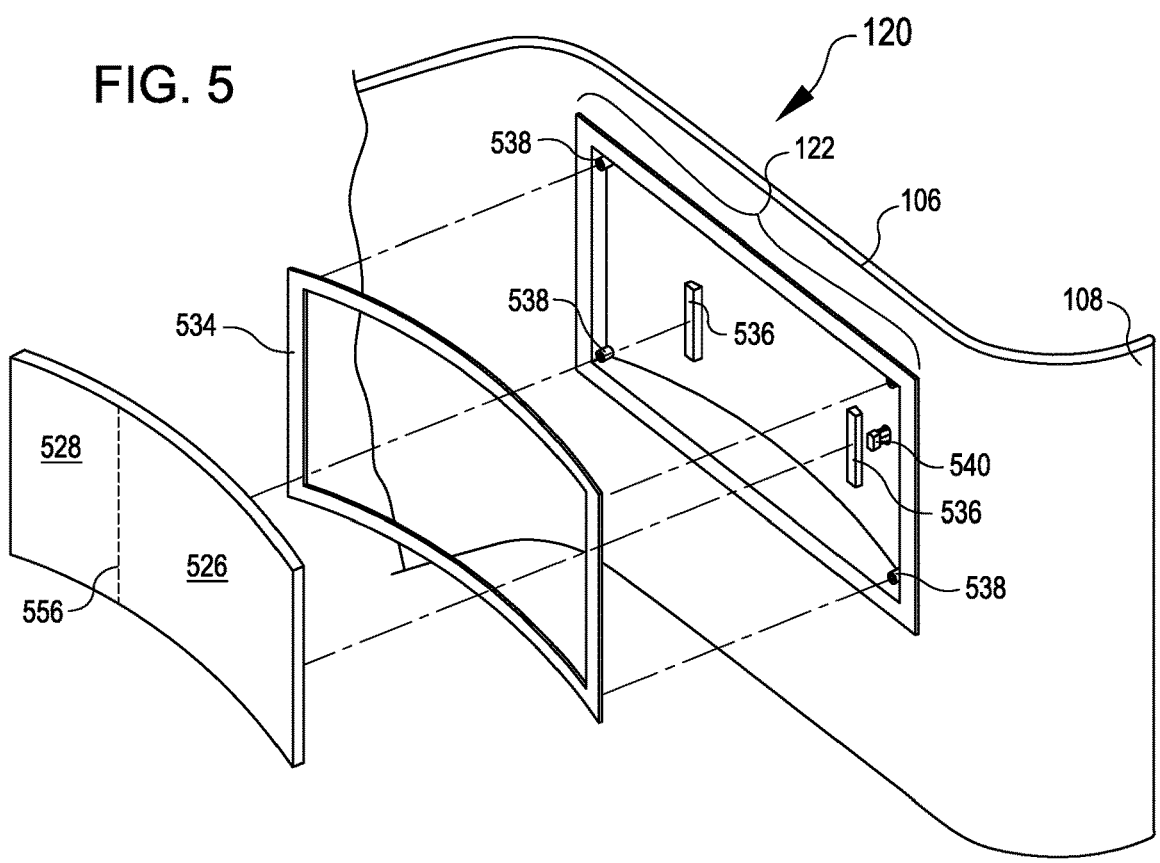
FIG. 5 is a perspective view showing an extended display assembly for a privacy enclosure or screen having a monolithic display device.

Embodiments described above focus primarily on systems employing multiple monitors, which provide several advantages. However, some aspects of the disclosure can be implemented in systems employing singular or monolithic displays that can be subdivided in software. For example, FIG. 5 is a perspective view showing an alternatively configuration of the extended display assembly 120 for a privacy enclosure 104 where the main and secondary displays 526, 528 are elements of a singular display device separated at a display boundary 556. As shown, an outer frame 122 is connected with a passenger-facing surface 106 of the privacy enclosure 104, and includes a main display 526 and contiguous secondary display 528 installed therein.

The combination main and secondary displays 526, 528 can have any suitable dimension or aspect ratio as described above with respect to embodiments that include physically separated main and secondary displays. As described in detail with reference to FIG. 2, the displays 526, 528 can be matched with the outer frame 122 either directly, or by way of a matching insert 534. The combined displays 526, 528 can be connected with the enclosure 104 or the outer frame 122 by way of a primary support bracket 536, and the matching insert 534 can be connected with the enclosure or outer frame by way of a second support bracket 538. In some alternative embodiments, the matching insert 534 may instead attach with the displays 526, 528 or with the outer frame 122 by way of a snap fit or similar connection. The displays 526, 528 can be connected with a central computing device or controller by way of, e.g., a power or display connector 540, may connect wirelessly, or may include onboard processing and memory capable of controlling the displays.

Advantageously, providing main and secondary displays 526, 528 with a software-supplied display boundary 556 can enable the system to perform several additional functions. For example, in some operating modes, an associated controller may allow one of the displays to assume control of a greater portion and potentially all of the supplied visual space, e.g. the main display 526 may commandeer some portion or all of the space from the secondary display 528 during a movie, or the secondary display 528 may expand prior to takeoff or landing in order to relay crew instructions. Singular, extended displays may also be used in conjunction with alternate second displays, e.g. aisle-facing alternate secondary display 430 (FIG. 4). In general, unless explicitly contraindicated, the various combinations of features described in this disclosure may be combined without departing from the spirit of this disclosure.

FIG. 6 is a side section view illustrating the assembly of a first example of a modular extended display assembly 120 for a privacy enclosure 104, and may be applied to any of the example configurations described herein. As discussed above, an outer frame 122 is installed in or attached to the privacy enclosure 104. As shown, the outer frame 122 extends into the privacy enclosure 104 and provides a contiguous surface for attaching additional elements. According to various alternative embodiments, the outer frame can be a hollow frame allowing direct attachment of elements through the outer frame to the privacy enclosure 104.

The display 626 can attach with or through a back portion 632 of the outer frame 122 to a display attachment bracket 636 according to a variety of suitable attachment means. For example, the display 626 can be attached by snap-fit or sliding connectors, by bolts or screws, or other suitable attachment means. In some embodiments, the display 626 can be attached without being fixed to the enclosure 104, and can be secured by the attachment of the matching insert 634. The matching insert 634 can be assembled with the outer frame 122 and display 626 by way of matching insert attachment elements 638 into the outer frame 122, either to or through the back portion 632 thereof. The display attachment bracket 636 and insert attachment elements 638 are preferentially sized based on the depth of the display 626 and the matching insert 634 so that the visible surfaces of the display and insert are approximately coplanar with each other, and in some cases, also coplanar with at least part of the outer frame 122. In some embodiments, the matching insert body 660, which surrounds a matching insert void 662 that aligns with the display 626, can further include a shaped or beveled inner edge 668 that aligns with, matches, and/or secures the display by interfacing with a matching display device edge 670. In some cases, the matching insert 634 can be secured to the outer frame 122 by way of one or more structural connectors 664, e.g. bolts, screws, or the like.

FIG. 7 is a side section view illustrating the assembly a second example of a modular extended display assembly 120 for a privacy enclosure 104. As discussed above, an outer frame 122 is installed in or attached to the privacy enclosure 104. Also, as shown, the outer frame 122 can extends into the privacy enclosure 104 and provides a contiguous surface for attaching additional elements, and may include a back portion 732 to which structural elements can be attached. The display 726 can attach with or through a back portion 732 of the outer frame 122 to a display attachment bracket 736 according to a variety of suitable attachment means. For example, the display 726 can be fixed with respect to the enclosure 104 by snap-fit or sliding connectors, by bolts or screws, by magnetic connectors or contact adhesives, or other suitable attachment means. The matching insert 734 can then be attached with the assembly 120 by securing the matching insert to the display 726, to the frame 122, or also to the enclosure 104. In some embodiments, the display 726 can be attached without being fixed to the enclosure 104, and can be secured by the attachment of the matching insert 734.

The matching insert 734 can be assembled with the outer frame 122 and display 726 by way of matching insert attachment elements 738 into the outer frame 122, either to or through the back portion 732 thereof. In some embodiments, the matching insert body 760, which surrounds a matching insert void 762 that aligns with the display 726, can include a shaped conduit or snap-fit edge 768 that removably secures the matching insert to the display by interfacing with a mating, snap fit display device edge 770. In some cases, the matching insert 734 can be secured to the outer frame 122 by way of one or more structural connectors 764, e.g. bolts, screws, magnets, pressure adhesives, or the like.

Structural components described here such as, but not limited to, the enclosure 104 and portions of the display assembly 120 may be formed of materials including but not limited to aluminum, stainless steel, aramid fibers, polycarbonate, polypropylene, other metallic materials, composite materials, or other similar materials. Any or all of the primary and secondary display devices disclosed herein may take the form of monitors configured to receive digital display signals from a centralized computing system, may include additional processors and memory therein for processing and displaying content, or may be self-contained computing devices that can autonomously provide content to users, and may be controlled by a centralized system (e.g. by way of wired or wireless connections) to provide specific information to passengers such as informational videos or announcements, or that may interface with a database containing media thereon for distributing to passengers, such as movies, music, travel information, and the like.

In the following, further examples are described to facilitate the understanding of the invention:

Example A. A display assembly, comprising: an outer frame comprising an outer face and a first set of attachment elements for connecting the outer frame with a passenger-facing internal aircraft structure, the outer frame comprising a first void therethrough having a first boundary; an insert having an exterior dimension sized to match the first boundary of the first void through the outer frame and a second void through the insert, the second void having an internal boundary shaped to receive a display device; an inner frame comprising a second set of attachment elements for connecting the display device with the passenger-facing internal aircraft structure, when the display device is received within the insert.

Example B. The display assembly of example A, further comprising the display device.

Example C. The display assembly of example B, wherein the display device is a first display device and the outer face of the outer frame comprises a second display device, the first display device and second display device having different inputs configured to cause the first and second display devices to display different information to a passenger simultaneously.

Example D. The display assembly of any of the preceding examples, wherein the display device is a first display device and the outer face of the outer frame comprises a second display device, the first display device and second display device configured to display different portions of an extended display.

Example E. The display assembly of any of the preceding examples, wherein: the display device is a first display device and the outer face of the outer frame comprises a second display device; the first display device is positioned on the outer frame so that, when the outer frame is connected with the passenger-facing internal aircraft structure, the first display device directly faces a passenger seat; and the second display device is positioned on a side surface of the outer frame so that, when the outer frame is connected with the passenger-facing internal aircraft structure, the second display device substantially faces an aisle adjacent the passenger seat.

Example F. The display assembly of any of the preceding examples, wherein the first boundary of the first void through the outer frame is shaped to cooperate with the exterior dimension of the insert in a snap fit.

Example G. The display assembly of any of the preceding examples, wherein the internal boundary of the second void through the insert is shaped to cooperate with a second external dimension of the display device in a snap fit.

Example H. The display assembly of any of the preceding examples, wherein the outer frame and insert are shaped to align with the display device such that front surfaces of each of the outer frame, insert, and display device are substantially coplanar.

Example I. A seat arrangement comprising a passenger seat, a privacy enclosure positioned forward of the passenger seat, and the display assembly of any of the preceding examples, wherein the first and second sets of attachment elements are mounted to the privacy enclosure.

Example J. A dual-display assembly for a passenger compartment, the assembly comprising: a first frame comprising an outer face and a first set of attachment elements for connecting the first frame with a passenger-facing internal aircraft structure; a first display positioned within the first frame and arranged to directly face a passenger seat when installed in the passenger-facing internal aircraft structure; and a second display connected with and positioned laterally relative to the first display, wherein the first and second displays are configured to simultaneously display information from two different sources.

Example K. The dual-display assembly of example J, wherein the first and second displays comprise first and second subsets of a single screen having a wide-screen aspect ratio, the first and second displays being configured to receive separate image data corresponding to the two different sources.

Example L. The dual-display assembly of any of the preceding examples, wherein the first and second displays comprise two separate physical screens separated by a nonzero distance, the second display being at a nonzero angle with respect to the first display.

Example M. The dual-display assembly of any of the preceding examples, further comprising a second frame connected with and positioned laterally with respect to the first frame, the second frame comprising: a first void therethrough having a first boundary; and an insert having an exterior dimension sized to match the first boundary of the void through the second frame and a second void through the insert, wherein the second display is received in the second void.

Example N. The dual-display assembly of any of the preceding examples, wherein the first and second displays have a combined diagonal dimension in a range of 38 to 61 cm (about 15" to 24"), preferably 53 to 61 cm (about 21" to 24").

Example O. The dual-display assembly of any of the preceding examples, further comprising an enclosure shaped to partially enclose a portion of a passenger seat and configured to attach to a cabin floor, wherein the first frame is attached to an aft portion of the enclosure.

Example P. A privacy enclosure for a passenger seat, comprising: an enclosure shaped to partially enclose a portion of a passenger seat and configured to attach to a cabin floor; and a dual-display assembly according to any of the preceding examples, the dual-display assembly connected with an aft portion of the enclosure, the assembly comprising: a first display connected with the aft portion of the enclosure and arranged to directly face a passenger seat when connected with the enclosure; and a second display connected with and positioned laterally relative to the first display, wherein the first and second displays are configured to simultaneously display information from two different sources.

Example Q. The privacy enclosure of example P, wherein the first and second displays comprise first and second subsets of a single screen having a wide-screen aspect ratio.

Example R. The privacy enclosure of any of the preceding examples, wherein the first and second displays comprise first and second display devices that are physically separate from each other by a nonzero distance.

Example S. The privacy enclosure of any of the preceding examples, wherein the enclosure has a side portion positioned substantially orthogonal to the aft portion, and wherein the second display is connected with and facing outward from the side portion.

Example T. The privacy enclosure of any of the preceding examples, further comprising an outer frame connected to the aft portion of the enclosure and supporting the first and second displays, the outer frame comprising an insert having an exterior dimension sized to match a first boundary of the void through the outer frame and a second void through the insert, the second void having a second boundary shaped to receive one or both of the first and second displays.

Example U. The privacy enclosure of any of the preceding examples, wherein the dual-display assembly can tolerate at least a 10 G load, preferably at least a 12 G load, without detaching from the enclosure.

Example V. A method of installing a display assembly, the method comprising: with a display assembly comprising: an outer frame comprising a first set of attachment elements and a first void therethrough having a first boundary; an insert having an exterior dimension sized to match the first boundary of the first void and a having a second void through the insert having a second boundary shaped to receive a display device; an inner frame comprising a second set of attachment elements; connecting the outer frame with an aircraft structure facing a passenger seat by the first set of attachment elements; connecting the inner frame with the aircraft structure such that the inner frame is aligned with the void in the outer frame; mounting the display device to the inner frame within the first void; and mounting the insert within the first void such that the exterior dimension of the insert is aligned with the first boundary and such that the second void matches an exterior dimension of the display device.

Example W. The method of example V, wherein mounting the insert comprises attaching the insert to the first void by a snap fit.

Example X. The method of any of the preceding examples, wherein mounting the insert comprises attaching the insert with the aircraft structure by a removable connector.

Example Y. The method of any of the preceding examples, wherein the aircraft structure is a privacy enclosure positioned forward of the passenger seat.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the examples below.

That which is claimed is:

1. A display assembly, comprising:
an outer frame comprising an outer face and a first set of attachment elements for connecting the outer frame with a passenger-facing internal aircraft structure, the outer frame comprising a first void therethrough having a first boundary;
an insert having an exterior dimension sized to match the first boundary of the first void through the outer frame and a second void through the insert, the second void having an internal boundary shaped to receive a display device;
an inner frame comprising a second set of attachment elements for connecting the display device with the passenger-facing internal aircraft structure, when the display device is received within the insert; and
the display device, wherein:
the display device is a first display device and the outer face of the outer frame comprises a second display device;
the first display device is positioned on the outer frame so that, when the outer frame is connected with the passenger-facing internal aircraft structure, the first display device directly faces a passenger seat; and the second display device is positioned on a side surface of the outer frame so that, when the outer frame is connected with the passenger-facing internal aircraft structure, the second display device substantially faces an aisle adjacent the passenger seat.

2. The display assembly of claim 1, wherein the first display device and second display device have different inputs configured to cause the first and second display devices to display different information to a passenger simultaneously.

3. The display assembly of claim 1, wherein the first display device and second display device are configured to display different portions of an extended display.

4. The display assembly of claim 1, wherein the first boundary of the first void through the outer frame is shaped to cooperate with the exterior dimension of the insert in a snap fit.

5. The display assembly of claim 1, wherein the internal boundary of the second void through the insert is shaped to cooperate with a second external dimension of the display device in a snap fit.

6. The display assembly of claim 1, wherein the outer frame and insert are shaped to align with the display device such that front surfaces of each of the outer frame, insert, and display device are substantially coplanar.

7. A seat arrangement comprising a passenger seat, a privacy enclosure positioned forward of the passenger seat, and the display assembly of claim 1, wherein the first and second sets of attachment elements are mounted to the privacy enclosure.

8. A privacy enclosure for a passenger seat, comprising:
an enclosure shaped to partially enclose a portion of a passenger seat and configured to attach to a cabin floor; and
a dual-display assembly connected with an aft portion of the enclosure, the dual-display assembly comprising:
a first display connected with the aft portion of the enclosure and arranged to directly face a passenger seat when connected with the enclosure; and
a second display connected with and positioned laterally relative to the first display, wherein the first and second displays are configured to simultaneously display information from two different sources;
wherein the enclosure has a side portion positioned substantially orthogonal to the aft portion, and wherein the second display is connected with and facing outward from the side portion.

9. The privacy enclosure of claim 8, wherein the first and second displays comprise first and second subsets of a single screen having a wide-screen aspect ratio.

10. The privacy enclosure of claim 8, wherein the first and second displays comprise first and second display devices that are physically separate from each other by a nonzero distance.

11. The privacy enclosure of claim 8, further comprising an outer frame connected to the aft portion of the enclosure and supporting the first and second displays, the outer frame comprising an insert having an exterior dimension sized to match a first boundary of a first void through the outer frame and a second void through the insert, the second void having a second boundary shaped to receive one or both of the first and second displays.

12. The privacy enclosure of claim 8, wherein the dual-display assembly can tolerate at least a 10 G load without detaching from the enclosure.

* * * * *